United States Patent [19]
Clausing

[11] 3,794,889
[45] Feb. 26, 1974

[54] OPEN AIR GAP OPERATION WITH STATIC OVERLOAD DEVICE
[75] Inventor: Challiss I. Clausing, Marlton, N.J.
[73] Assignee: I-T-E Imperial Corporation, Spring House, Pa.
[22] Filed: June 18, 1973
[21] Appl. No.: 370,766

[52] U.S. Cl........ 317/27 R, 317/33 SC, 317/36 TD, 317/46
[51] Int. Cl. ............................................. H02h 3/28
[58] Field of Search.........317/26, 27 R, 46, 36 TD, 317/33 SC

[56] References Cited
UNITED STATES PATENTS
1,667,655  4/1928  Clothier et al.................... 317/27 R
2,384,375  9/1945  Hayward........................... 317/27 R
1,329,255  1/1920  Rosebourne....................... 317/26

Primary Examiner—James D. Trammell
Attorney, Agent, or Firm—Ostrolenk, Faber, Gerb & Soffen

[57] ABSTRACT

A tripping unit for a circuit breaker is energized by a current transformer which has two identical winding for each phase of the power circuit being protected. One set of windings is connected to one winding of an overload magnet, and the second set of windings is connected to a second and identical winding on the magnet. The second set of windings is further connected to the a-c terminals of a single phase, full wave bridge which has its d-c terminals connected to a switching device which is operable by a timing circuit. The armature of the magnet is spring loaded to a normally open position and the opposing fluxes produced in the two identical windings of the magnet are normally insufficient to close the armature to trip a circuit breaker. However, when a fault current is created, the timing circuits eventually fire the switching device in the full wave bridge to short-circuit the second winding on the overload magnet to permit the other winding to produce a sufficiently strong magnetic field to close the armature and trip the circuit breaker.

9 Claims, 1 Drawing Figure

PATENTED FEB 26 1974 3,794,889
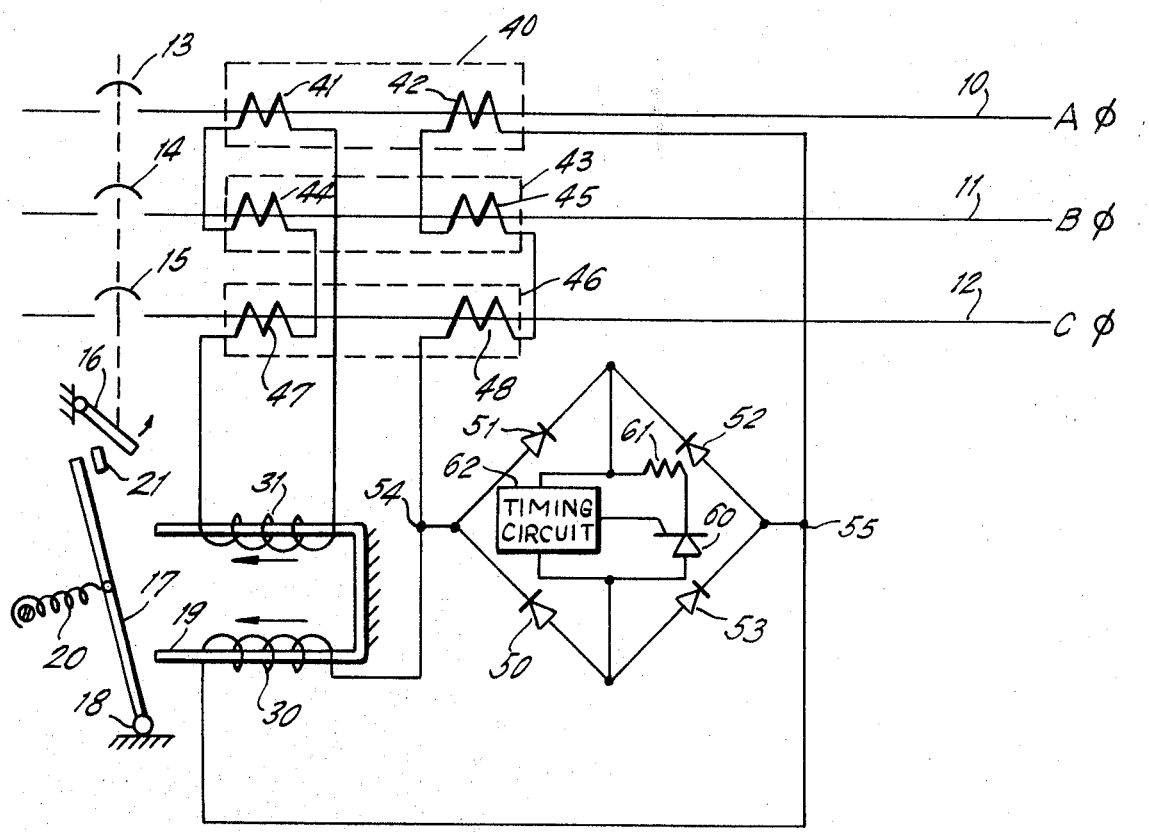

ical type of solid state relay type control could also be used as will be obvious to those skilled in the art. The thyristor will then act as a short circuit across its current transformer secondary. The other transformer secondary winding associated with the faulted phase or phases will then be the major input to the overload magnet and will cause the tripping armature to operate against a bias-open spring force. After tripping, the magnet windings will be deenergized, and the armature will be automatically reset by the biasing springs.
3,794,889

OPEN AIR GAP OPERATION WITH STATIC OVERLOAD DEVICE

BACKGROUND OF THE INVENTION

This invention relates to a novel magnetic trip unit and control circuit therefor, and more specifically relates to a novel trip circuit for a circuit breaker wherein the trip circuit uses an overload magnet structure which has a normally open armature.

Overload magnet structures for tripping circuit breakers in response to a given overload current are well known to those skilled in the art. Frequently, these devices will contain a source of biasing flux which cooperates with a flux produced by current derived from the energizing windings. These two fluxes cooperate with one another to normally seal an armature closed when current conditions being monitored are in an acceptable range. When the current being monitored reaches a given magnitude, however, the total flux through the armature becomes insufficient to hold it closed against an opening biasing spring force, so that the armature opens to operate the tripping mechanism of a circuit breaker.

Devices of this kind have several disadvantages including the need for critical machining and sealing at the normally closed gap between the armature and the magnet, and further require a source of reset energy for resetting the armature after the tripping operation. Moreover, prior art devices generally required relatively large amounts of power which had to be obtained from an auxiliary circuit.

BRIEF SUMMARY OF THE INVENTION

The present invention is for a novel tripping unit which derives power directly from the faulted circuit, but which may still be controlled by a conventional static overload device. In accordance with the invention, each phase of the power circuit is equipped with a current transformer (or other suitable sensor) having two identical windings. The output of these windings is fed to respective identical magnet windings on an open gap overload magnet (or a suitable solenoid). The windings on the magnet are connected such that fluxes which they induce flow in opposition to one another.

A bridge circuit is connected across one secondary winding and produces a d-c signal related in some manner to the level of fault current. The d-c signal feeds static overload device timing circuits which eventually fire a thyristor or other switching device in a conventional manner. One typical solid state type timing circuit which can be used in connection with the present invention is the circuit shown in U.S. Pat. No. 3,319,127, entitled STATIC OVERCURRENT RELAY, in the name of S.E. ZOCHOLL et al. and assigned to the assignee of the present invention. Any other convent Two of the major advantages of the present invention are that no mechanical reset or other type reset is required for the trip magnet which would otherwise take energy away from the opening springs of the circuit interrupter. Equally important is that the magnet becomes relatively easy to manufacture as compared to a magnet which must have a normally sealed armature since the critical machining and sealing problems of the sealed gap device are eliminated.

BRIEF DESCRIPTION OF THE DRAWING

The drawing shows a schematic circuit diagram of one embodiment of the present invention.

DETAILED DESCRIPTION OF THE DRAWING

Referring to the drawing, there is illustrated a three-phase power system which contains three phases 10, 11 and 12 which are, for example, an A phase, B phase and C phase, respectively. Each of phases 10, 11 and 12 have circuit breaker poles 13, 14 and 15 in series therewith where the poles 13, 14 and 15 are the poles of a conventional circuit breaker.

Each of the poles 13, 14 and 15 are operatively connected to a pivotally mounted tripper bar 16 of conventional type which, when rotated counterclockwise, causes the tripping of the circuit breaker poles 13, 14 and 15. The tripper bar 16 is, in turn, operated by an elongated magnetic armature 17 which is pivotally mounted on pivot 18 and, in accordance with the invention, is spring biased to a normally open position relative to the stationary magnet 19 by biasing spring 20.

The upper end of armature 17 contains a striker pad 21 which engages the tripper bar 16 and moves the tripper bar 16 counterclockwise in order to operate the circuit breaker poles 13, 14 and 15 when the armature 17 is moved clockwise by the magnetic field at the open gap of stationary magnet 19. Stationary magnet 19 is a conventional U-shaped magnet which may be composed of a conventional lamination stack or can be a C-core type magnet. Regardless of the structure of the magnet body, the magnet is provided with two eindings 30 and 31 which may be identical and, as will be later seen, are energized normally to set up substantically equal and opposing magnetic fluxes, so that the flux in the gap between the opened end of the U-shaped or C-shaped magnet 19 and the armature 17 is too small to cause the armature 17 to move against the force of biasing spring 20. In the preferred embodiment of the invention, the gap flux is substantially zero during normal current conditions.

In accordance with one aspect of the invention, the winding 31 is energized directly proportionally to the current flowing in the three phase lines 10, 11 and 12, while winding 30 is energized in this manner except that current to winding 30 is switched off once the monitored current exceeds some given value. Thus, the flux due to winding 31 will now be sufficient to move armature 17 forcefully in a clockwise direction in opposition to the spring force of spring 20 to close the air gap and to cause pad 21 to operate tripper bar 16 to, in turn, open circuit breaker poles 13, 14 and 15.

The current monitor consists of three current transformers, one for each phase, wherein each current transformer contains two identical secondary windings, Thus, current transformer 40 associated with phase 10 contains secondary windings 41 and 42, current transformer 43 associated with phase 11 has secondary windings 44 and 45, and current transformer 46 associated with phase 12 has identical windings 47 and 48. The windings 41, 44 and 47 are then connected as shown and in series with one another and with winding 31. Windings 42, 45 and 48 are connected identically to windings 41, 44 and 47, but are connected in series with winding 30. Thus, under normal circumstances, windings 30 and 31 will be identically energized and no net flux will circulate in the magnet core 19.

A montiroing circuit is then connected in parallel with winding 30 and includes the single phase, full wave bridge connected rectifier containing diodes 50, 51, 52 and 53. The a-c input terminals 54 and 55 of the single phase, full wave rectifier are connected directly across the terminals of winding 30. The d-c terminals of the bridge are connected in series with the parallel combination of a thyristor 60 and current limiting resistor 61 and a solid state timing circuit 62.

Under normal current conditions, the switching device 60 will be nonconductive so that windings 30 and 31 are equally energized. If, however, an overload condition exists in the circuit being monitored, the d-c voltage output of the bridge will similarly increase to cause the timing operation of a conventional timing circuit 62, whereby the thyristor 60 will be fired at some time suitably related to the magnitude of the overload current. The current transformer windings 42, 45 and 48 are then short-circuited so that the magnetomotive force generated in winding 31 predominates over that produced by winding 30, thereby causing armature 17 to move in a clockwise direction, to operate the circuit breaker poles 13, 14 and 15 to their open condition.

Once the circuit breakers are opened, both windings 30 and 31 are deenergized and spring 20 will move the armature 17 to its normally open position without requiring any auxiliary source of reset power.

Although this invention has been described with respect to preferred embodiments, it should be understood that many variations and modifications will now be obvious to those skilled in the art, and it is preferred, therefore, that the scope of this invention be limited, not by the specific disclosure herein, but only by the appended claims.

The embodiments of the invention in which an exclusive privilege or property is claimed are defined as follows:

1. A tripping system for operating a circuit interrupter in response to predetermined electrical conditions in a circuit being protected; said tripping system comprising, in combination:

a tripping magnet comprising a magnetic core having an air gap therein, an armature generally disposed across said air gap and movable between a relatively sealed position and a relatively unsealed position relative to said air gap, and biasing means operatively coupled to said armature for normally biasing said armature to said relatively unsealed position, and first and second windings disposed on said magnetic core;

a circuit interrupter connected in series with said circuit being protected and having a trip means; said trip means operatively connected to said armature and being operated to open said circuit interrupter when said armature moves to said relatively sealed position relative to said air gap;

first and second current monitor means coupled to said circuit being protected, each having respective first and second output terminals for producing respective output signals related to said predetermined electrical conditions, said first and second output terminals of said first and second current monitor means being respectively connected across said first and second windings of said magnet, said first and second windings producing oppositely directed magnetic fluxes in said magnetic core due to the outputs at said terminals of said first and second monitor means, whereby the net flux in said air gap is normally too low to move said armature to said sealed position against the force of said biasing means;

switch means connected across said first and second terminals of said first current monitor means and operable between a conducting and a nonconducting condition and operating circuit means coupled to said switch means for operating said switch means from a normally nonconducting condition to a conducting condition in response to said predetermined electrical conditions as monitored by said first current monitor means, whereby the magnetic flux generated at said first winding is decreased and the net magnetic flux in said magnetic core becomes sufficiently high to move said armature to its said sealed position.

2. The tripping system of claim 1, wherein said first and second windings are substantially identical to one another and wherein said first and second current monitor means are substantially identical to one another.

3. The tripping system of claim 1, wherein said first and second current monitor means comprise the secondary windings of a current transformer.

4. The tripping system of claim 1, wherein said biasing means comprises a spring.

5. The tripping system of claim 1, wherein said switch means comprises a thyristor type device.

6. The tripping system of claim 3, wherein said predetermined electrical conditions are overload current conditions.

7. The tripping system of claim 6, wherein said operating circuit means includes a timing circuit means for operating said switch means after a given time which is related to the overload current magnitude.

8. The tripping system of claim 7, wherein said switch means comprises a thyristor type device.

9. The tripping system of claim 8, wherein said first and second current monitor means comprise the secondary windings of a current transformer.

* * * * *